Patented July 17, 1951

2,560,770

UNITED STATES PATENT OFFICE 2,560,770

REACTION OF ALLYL ETHERS WITH ALDEHYDES TO PRODUCE KETONES

Elbert C. Ladd, Passaic, N. J., assignor to United States Rubber Company, New York, N. Y., a corporation of New Jersey No Drawing. Original application November 9, 1946, Serial No. 708,929. Divided and this application August 9, 1949, Serial No. 109,413

4 Claims. (Cl. 260—594)

This invention relates to improvements in the manufacture of ketones.

This application is a division of my copending application Serial No. 708,929, filed November 9, 1946, which issued as Patent No. 2,533,944 on December 12, 1950.

It is known (U. S. Patent No. 1,725,362) that when vinyl compounds such as vinyl acetate are heated together with aliphatic aldehydes, polymeric products result which are gummy or resinous materials. In contrast, I have found that when non-hydrocarbon 2-propenyl compounds having the essential linkage

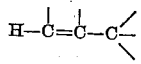

are reacted under free-radical conditions (e. g., in the presence of free radicals and/or substances capable of yielding free radicals), with a non-enic non-tertiary hydrocarbon aldehyde containing only carbon, hydrogen, and oxygen, that well defined ketones may be obtained as the chief product. The expression "non-enic" is used to exclude ethylenic and acetylenic aldehydes. The expression "non-tertiary hydrocarbon" refers to a hydrocarbon group free of tertiary carbon atoms.

The reaction of my invention is illustrated by the following equation:

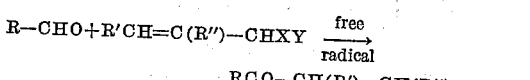
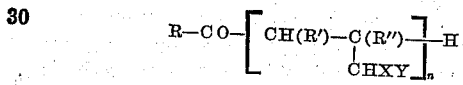

where R is non-tertiary hydrocarbon; R' is hydrogen, methyl, halomethyl, or halogen; R" is hydrogen, alkyl, aryl, halogen, haloalkyl, or acyloxymethyl; X is nitrogen, oxygen, or halogen; Y is hydrogen or oxygen; or X and Y together is oxygen. Halo and halogen refer to halogen atoms having an atomic weight less than 40, that is, chlorine and fluorine.

More specifically, R may be represented by methyl, ethyl, propyl, butyl, amyl, hexyl, isopropyl, isobutyl, sec.-amyl, cyclopentyl, cyclohexyl, phenyl, and functionally aliphatic radicals such as phenylethyl, phenylmethyl, etc.

Representative aldehydes are acetaldehyde, propionaldehyde, butyraldehyde, isobutyraldehyde, heptaldehyde, cyclohexanal, benzaldehyde, phenylacetaldehyde, etc.

Illustrative of suitable 2-propenyl compounds are allyl alcohol, methallyl chloride, 2-chloromethyl allyl chloride, allyl chloride, allyl ethyl ether, allyl furfuryl ether, allyl octyl ether, di-methallyl ether, diallyl formal, acrolein ethyl acetal, 2-acetoxy-methyl allyl acetate, allyl acetate, allyl ethyl carbonate, allyl caproate, allyl laurate, methallyl benzoate, crotyl acetate, cinnamyl acetate, 2-chloroallyl butyrate, methallyl carbamate, methallyl ethyl sulfate, N-allyl phthalimide, N-allyl acetamide, 3-nitropropene-1, allyl triethylsilicate, methallyl dimethyl phosphate, etc.

The preferred 2-propenyl compounds are those of the formula R'CH=C(R")—CH₂X where R', R" and X are as above defined, since these types are more easily available.

Any of the conventional sources of free radicals such as ultra-violet light, may be employed in the method of my invention, although peroxidic compounds, particularly organic peroxides such as dibenzoyl peroxide, diacetyl peroxide, tertiary-butyl hydroperoxide, among others, are advantageous in commercial scale operations and are consequently preferred.

The above formula for the final product in the illustrative equation represents the 1:1 product, i. e., 1 mole of aldehyde to 1 mole of the 2-propenyl compound, which constitutes a substantial proportion by weight of the reaction product. The reaction product may also include higher boiling ketones of the type formula where $n$ is an integer greater than 1.

Appreciable quantities of the compounds of the latter type can be obtained from the reaction of aldehydes with readily polymerizable 2-propenyl compounds such as 2-propenyl esters of polybasic acids, e. g., diallyl phthalate, dimethallyl fumarate and diallyl succinate, and 2-propenyl esters of unsaturated mono-carboxylic acids, e. g., allyl acrylate. This behavior, however, is not generally characteristic of all 2-propenyl compounds containing one or more additional olefinic linkages since others, such as diallyl ether and diallyl formal, react with aldehydes to yield largely the "one-to-one" ketonic products.

The reaction of my invention is carried out by heating a mixture of the aldehyde, the 2-propenyl compound and the peroxide in the presence or absence of an inert diluent, and at temperatures sufficient to decompose the peroxidic compound, and which are generally in the range of from 0° C. to approximately 140° C. In the case of the more volatile aldehydes and 2-propenyl compounds, the reactions may be carried out under superatmospheric pressures.

The ratio of the reactants may be varied over a wide range, but it is preferable to employ at least one mole of aldehyde per mole of the 2-propenyl compound, and in practice an excess of the aldehyde, e. g., molar ratio of 2/1 to 15/1, may be employed, if desired. A molar ratio of 1/1 or greater is particularly desirable for the reaction of aldehydes with the above-mentioned readily polymerizable 2-propenyl compounds, in order to minimize polymerization and other side reactions, which deleteriously affect the yield of the desired ketones. In cases where it may prove inconvenient or impractical to employ a large excess of the aldehyde reactant, the 2-propenyl compound can be added incrementally to the reaction mixture whereby a substantial excess of the aldehyde is in effect maintained throughout a major portion of the reaction period.

The amount of the peroxidic compound employed as a source of free radicals in my invention varies with the nature of the reactants as well as with the reaction conditions, but amounts in the range of from 1 to 15 mole percent of the 2-propenyl compound, are normally sufficient. When reaction times are protracted it is often desirable to add the peroxide portion-wise throughout the reaction to ensure the presence of an adequate concentration of free radicals in the reaction mixture at all times.

The reaction is carried out until a substantial conversion of the 2-propenyl compound to the desired ketone is secured. The reaction is then halted by cooling, and the unreacted starting materials are removed by evaporation under diminished pressure. The desired ketone may be then recovered by fractional distillation. In the case of very high-boiling products, fractional crystallization from the reaction mixture may prove more convenient.

The following examples disclose my invention in more detail, all parts being by weight:

Example 1

A mixture of 110 parts of allyl acetate, 500 parts of acetaldehyde, and 8 parts of dibenzoyl peroxide, is heated in an autoclave of 1200 ml. capacity for about 48 hours at about 70° C. After cooling to room temperature, the reaction mixture is removed from the autoclave, the unreacted allyl acetate and acetaldehyde are distilled off, and the residue is fractionally distilled in vacuo to yield 82.5 parts of 3-acetopropyl acetate as the major component of the reaction product; b. pt. 66.5–67° C./3 mm.; $\eta_D^{20}$=1.021; saponification equivalent 144.7; 2,4-dinitrophenylhydrazone, m. pt. 77.5–78° C.

Repetition of the reaction at 90° C. using a mixture of 100 parts of allyl acetate, 176 parts of acetaldehyde and 2.4 parts of dibenzoyl peroxide yields 91 parts of 3-aceto-propyl acetate in 2 hours.

The ester is readily converted to the vitamin B1 intermediate, 3-chloro-3-acetopropyl acetate by chlorination.

Example 2

To a mixture of 132 parts of allyl acetate and 954 parts of n-butyraldehyde at 80° C. are added 6.3 parts of dibenzoyl peroxide and after heating for 20 hours at atmospheric pressure an additional 6.3 parts of peroxide are added. The reaction is completed by heating 28 hours more, after which the unreacted starting materials are removed by distillation and the residue fractionally distilled in vacuo to yield 93.8 parts of 3-butyropropyl acetate; b. pt. 111–114° C./11 mm.; $\eta_D^{20}$=1.4311, $d_4^{20}$=0.9805.

Analysis—
  Found: C, 63.8%; H, 9.18%;
  Theory: C, 62.7%; H, 9.37%.

Example 3

A solution of 78.5 parts of acrolein ethyl acetal in 450 parts of n-butyraldehyde is heated at 75° C. and atmospheric pressure for 37 hours during which time 22.5 parts of dibenzoyl peroxide are added in five equal portions. The reaction is completed by heating for 16 additional hours and yields, after evaporation of the unreacted starting materials, 34.5 parts of the diethylacetal of 3-butyropropionaldehyde by fractional distillation; b. pt. 101–4° C./6 mm.; $\eta_D^{20}$=1.4352.

Analysis—
  Found: C, 65.83%; H, 10.96%;
  Theory: C, 65.36%; H, 10.97%.

Example 4

To a mixture of 86 parts of 2-acetoxymethylallyl acetate and 360 parts of n-butyraldehyde at 76° C. and atmospheric pressure are added 18 parts of dibenzoyl peroxide in four, approximately equal, portions in the course of 51 hours. The reaction is completed by heating 8 hours more, and after removal of the unreacted starting materials yields by fractional distillation 45 parts of 2-acetoxymethyl-3-butyropropyl acetate; b. pt. 154–9° C./7 mm.

Analysis—
  Found: C, 60.09%; H, 8.42%;
  Theory: C, 59.00%; H, 8.25%.

Example 5

To a solution of 98 parts of diallyl ether in 720 parts of n-butyraldehyde at 75° C. and atmospheric pressure are added 19 parts of dibenzoyl peroxide in four, approximately equal, portions during a period of 32 hours. The reaction mixture is further heated for 16 hours, after which unreacted starting materials are distilled off and the residue is fractionally distilled to yield 28 parts of 3-butyropropyl allyl ether; b. pt. 96–8° C./6 mm.; $\eta_D^{20}$=1.4539.

Analysis—
  Found: C, 70.31%; H, 10.57%;
  Theory: C, 70.5%; H, 10.6%.

Example 6

A mixture of 128 parts of diallyl formal, 720 parts of n-butyraldehyde and 4.4 parts of dibenzoyl peroxide is heated at approximately 75° C. and atmospheric pressure for 10 hours at which time an additional 5 parts of peroxide are introduced into the reaction mixture. Heating is continued for 10 hours when 5 parts more of peroxide are added and heating is then carried out for an additional 10 hours. Fractional distillation of the reaction mixture yields some unreacted starting materials together with 13 parts of 3-butyropropyl allyloxymethyl ether; b. pt. 78–81° C./1 mm.; $\eta_D^{20}$=1.4447.

Analysis—
  Found: C, 65.40%; H, 7.68%;
  Theory: C, 66.0%; H, 10.0%.

It should be noted that the reaction of poly-2-propenyl compounds with aldehydes according to my invention, as illustrated above in Examples 5 and 6, yields predominantly the unsaturated ketones, even when a considerable excess of the aldehyde is present in the reaction mixture. The diketones from the reaction of 2 moles of aldehyde with 1 mole of the dipropenyl compound are obtained only in minor amounts, if at all.

The various ketones of this invention, including those which are herein new, may be used inter alia as intermediates in chemical synthesis in the prdouction of dyes, perfumes, and pharmaceuticals.

Although my invention has been particularly described as applied to 2-propenyl compounds containing as the hetero atom either oxygen, nitrogen or halogen, the invention may also be applied to 2-propenyl compounds containing other hetero atoms, particularly silicon, phosphorus and sulfur. Exemplary of such compounds are ethyl 2-propenylphosphonate, allyl triethyl silane and methallyl ethyl sulfide.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. The process of preparing ketones which comprises reacting an allyl ether with an aldehyde of the formula RCHO where R is hydrocarbon having the carbon atom which is directly attached to the CHO selected from the class consisting of primary and secondary carbon atoms, in the presence of a peroxidic catalyst until the desired ketone is formed, and isolating said ketone.

2. The process of preparing ketones which comprises reacting a primary aliphatic aldehyde having the type formula RCHO in which R is a saturated linear hydrocarbon radical with an allyl ether in the presence of a peroxidic catalyst until the desired ketone is formed and isolating said ketone.

3. The process of preparing ketones which comprises reacting a primary aliphatic aldehyde having the type formula RCHO in which R is a saturated straight-chain hydrocarbon radical with an allyl ether in the presence of a peroxidic catalyst until the desired ketone is formed, and isolating said ketone.

4. The process of preparing ketones which comprises reacting a primary aliphatic aldehyde having the type formula $R-CH_2-CHO$ in which R is from the class consisting of hydrogen, and saturated straight-chain hydrocarbon radicals, with an allyl ether in the presence of a peroxidic catalyst until the desired ketone is formed and isolating said ketone.

ELBERT C. LADD.

REFERENCES CITED

The following references are of record in the file of this patent:

UNITED STATES PATENTS

| Number | Name | Date |
|---|---|---|
| 2,395,292 | Peterson et al. | Feb. 19, 1946 |
| 2,411,158 | Hanford | Nov. 19, 1946 |
| 2,440,801 | Hanford et al. | May 4, 1948 |